(12) United States Patent
Bagwell et al.

(10) Patent No.: US 12,013,743 B2
(45) Date of Patent: Jun. 18, 2024

(54) SOFTWARE-BASED POWER MANAGEMENT FOR VIRTUALIZATION PLATFORMS

(71) Applicant: VERIZON PATENT AND LICENSING INC., Basking Ridge, NJ (US)

(72) Inventors: Myron E. Bagwell, Southlake, TX (US); Brent D. Segner, Marysville, OH (US); Ryan M. O'Donnell, Phoenix, MD (US); Christopher A. Rollins, Averill Park, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 17/514,089

(22) Filed: Oct. 29, 2021

(65) Prior Publication Data

US 2023/0136437 A1 May 4, 2023

(51) Int. Cl.
| | |
|---|---|
| *G06F 1/00* | (2006.01) |
| *G06F 1/3287* | (2019.01) |
| *G06F 11/34* | (2006.01) |
| *G06F 18/21* | (2023.01) |
| *G06N 20/00* | (2019.01) |

(52) U.S. Cl.
CPC ........ *G06F 1/3287* (2013.01); *G06F 11/3452* (2013.01); *G06F 18/21* (2023.01); *G06N 20/00* (2019.01)

(58) Field of Classification Search
CPC .... G06F 1/3287; G06F 11/3452; G06F 18/21; G06F 1/3206; G06N 20/00; G06N 7/01; G06N 5/01; G06N 20/20; Y02D 10/00
See application file for complete search history.

(56) References Cited

U.S. PATENT DOCUMENTS

| | | | | |
|---|---|---|---|---|
| 2012/0166779 | A1* | 6/2012 | Muralidhar | G06F 1/3203 713/1 |
| 2015/0025848 | A1* | 1/2015 | Fukumoto | G06F 9/5061 702/186 |
| 2017/0205863 | A1* | 7/2017 | Lee | G06F 1/3206 |
| 2020/0409731 | A1* | 12/2020 | Zhang | G06F 9/5016 |
| 2022/0318017 | A1* | 10/2022 | Garg | G06F 9/3802 |

* cited by examiner

*Primary Examiner* — Xuxing Chen

(57) ABSTRACT

A predictive modeling approach to managing processing unit states is disclosed. In an embodiment, a method includes receiving data associated with a host device, including processor statistics. The method generates a feature vector for the host device which includes data derived from the processor statistics and classifies the feature vector using a predictive model. The predictive model can generate a processor state for the host device based on the feature vector. In response, the method can then issue a processor state change message to the host device based on the processor state. The processor state change message causes the host device to reduce power consumption of one or more processing units based on the processor state.

20 Claims, 5 Drawing Sheets

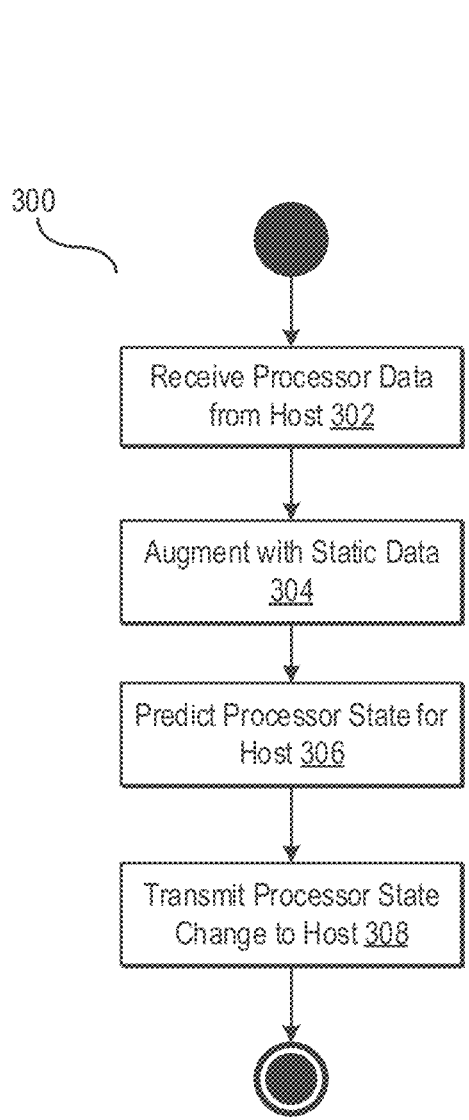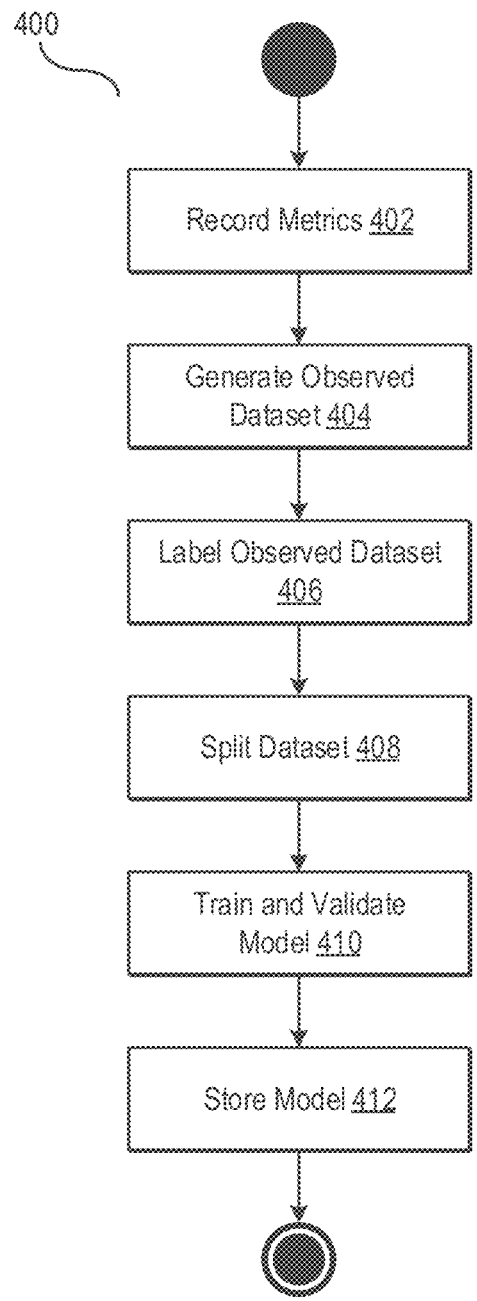
FIG. 3
FIG. 4

SOFTWARE-BASED POWER MANAGEMENT FOR VIRTUALIZATION PLATFORMS

BACKGROUND INFORMATION

With each new generation of central processing unit (CPU) devices, the energy needed to power a CPU increases. With each new feature, a corresponding function or increase in speed comes with an increase in the number of transistors in the CPU. The ever-increasing amount of power consumed by modern CPUs is a concern for those operating large compute infrastructures such as public or private clouds and edge computing. The change from enterprise to cloud to the edge will drive further increases in power consumption. Currently, solutions for managing the power consumption of such infrastructures fail to keep pace with the power demands of both CPUs and workloads placed thereon.

BRIEF DESCRIPTION OF THE DRAWINGS

FIG. 3 is a flow diagram illustrating a method for adjusting processor states according to some example embodiments.

FIG. 4 is a flow diagram illustrating a method for training a predictive model used for predicting a processor state according to some example embodiments.

DETAILED DESCRIPTION OF EXAMPLE EMBODIMENTS

Figure 1:
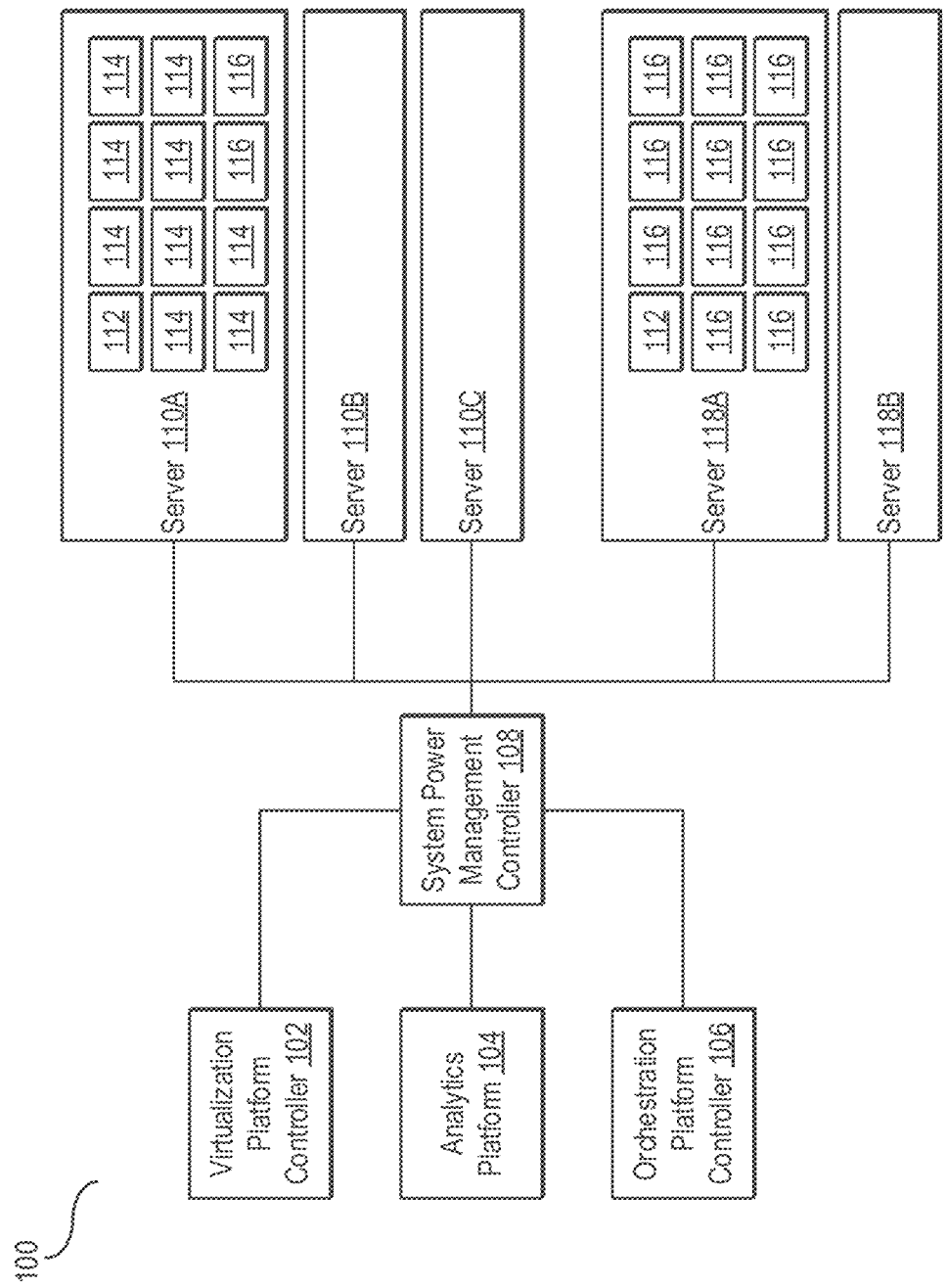
FIG. 1 is a block diagram of a system for adjusting processor states according to some example embodiments.

Currently, an average server-class CPU (e.g., a CPU with ten or more cores that support hyperthreading) consumes three watts of power and generates 10.25 BTU of heat per hour (BTU/h). As an example, the INTEL® XEON® Icelake 6338N has 32 p-cores or 64 threads with a thermal design power (TDP) of 185 watts. Dividing the TDP by the number of cores yields a power consumption of 2.890 watts per core. Further, every system in an enterprise computing, cloud computing, or edge computing environment has some number of CPU cores that are currently unallocated or that are orphaned due to issues with the bin packing of guest virtual machine workloads.

Disabling unallocated or orphaned cores can reduce power consumption and heat generation. When multiplied by the number of hosts in a large enterprise or carrier environment, this reduction in power consumption and heat generation can be significant, as defined by Equation 1:

$$t_p = \frac{(s*t_S + 0.5*c*t_C)*u}{1000} \quad \text{Equation 1}$$

In Equation 1, the total power that is expected to be used by the data center is represented by $t_p$ (in kilowatts). The calculation assumes that by taking the total number of servers ($t_s$) and multiplying the wattage required for non-processor related functions (s) (in watts), the total power baseline can be established. This baseline is then added to the processor-related wattage, which is calculated by taking the total physical cores (0.5t(c)) and multiplying the idle wattage per core (c) (in watts). The total compute power profile is then multiplied by the assumed power use efficiency ratio (u) to accommodate the cooling cost associated with the infrastructure.

Applying this same methodology to the unallocated CPU resources, the kWh impact and the related annual cost of the underutilized infrastructure can be derived, as represented in Equation 2:

$$t_p = \frac{(s*t_s + 0.5*c*t_c)*u}{1000} - \frac{(s*t_s + 0.5*c_a*c*t_c)*u}{1000} \quad \text{Equation 2}$$

In Equation 2, the only modification to the formula is that a modifier for thread availability ($c_a$) is applied to account for the fact that a percentage of the physical cores are partially used with one of the two available threads being consumed. For example, a private cloud of 20,000 servers with 50% CPU utilization would have roughly 1.3k kW/h being used to power processors without a guest virtual machine workload allocated.

Finally, enterprise, cloud, or edge computing implementations often have hardware that is being staged for production or that is idled for maintenance. Such inactive hardware likewise consumes unnecessary power. Reducing the number of active cores to a bare minimum to sustain operations (e.g., caretaker cores) and disabling the remaining cores in the platform can significantly reduce power consumption and heat generation for such idled hardware. Leaving caretaker cores enabled allows engineering and operations teams to monitor the host for faults, install patches, and install the firmware. When the full capacity of the server is required, additional cores can be enabled to meet those needs.

Reducing the power consumption and heat generation of the servers also has a secondary effect of reducing the power needed to cool the facility housing the servers. In many ways, this is a compounding effect.

The example embodiments use analytics data from a computing environment and uses this analytics data to ascertain which hosts within the fleet of hardware have processing units (PUs) (e.g., processor cores) that are unallocated or orphaned or hardware that is staged but not yet in production. As used herein, a PU can refer to an entire CPU, a single processing core of a CPU, a virtual CPU, or another element of processing. Once these PUs are identified, they can be placed in deep sleep, reducing power consumption and heat generation, as discussed in more detail herein.

In an embodiment, a method includes receiving data associated with a host device, including processor statistics. The method generates a feature vector for the host device, which includes data derived from the processor statistics and classifies the feature vector using a predictive model. The predictive model can generate a processor state for the host device based on the feature vector. In response, the method can then issue a processor state change message to the host device based on the processor state. The processor state change message causes the host device to reduce the power consumption of one or more processing units based on the processor state.

In an embodiment, the processor statistics of the host device can include a total number of processing units of the host device, a total number of active processing units of the host device, and/or a total number of inactive processing units of the host device. In an embodiment, the method can generate a feature vector by combining the data derived from the processor statistics with static data associated with the host device. The predictive model can be a decision tree, random forest, a naïve Bayes classifier, or the like. In an embodiment, the method generates a processor state by generating one of a c-state value (e.g., C0 through C10, including extended states, in Intel® processors) or a p-state value (e.g., P0 through P15 on Intel® processors). In some embodiments, this c-state or p-state value can be associated with one or more processing unit identifiers.

In some embodiments, the method can issue the processor state change message to the host device using a secure channel such as a secure shell, whereby the host device is configured to execute a script or binary to change a processor state of the host device.

In the various embodiments, devices, systems, and computer-readable media as disclosed for performing the methods described above and, in more detail, herein.

FIG. 1 is a block diagram of a system 100 for adjusting processor states according to some example embodiments.

In an embodiment, a system power management controller 108 is communicatively coupled to a virtualization platform controller 102, an analytics platform 104, and an orchestration platform controller 106. The system power management controller 108 is further communicatively coupled to a plurality of hosts, including host 110A, host 1106, host 110C, host 118A, and host 1186. A given host can include a networked computing device such as a server in a data center.

Each host can include a plurality of processing units (PUs). Examples of PUs include but are not limited to central processing unit (CPU) devices, processing cores, and other such devices. As illustrated, a given host can have multiple PUs. Each of these PUs can serve different functions and be in different states. For example, a host can include caretaker PUs 112 that may be required to sustain the operations of a host. A host can also include active PUs 114 that can be executing guest virtual machine workloads (e.g., applications). A host can also include unused PUs 116, such as orphaned or unallocated PUs. The given PUs in a system can change states and functions throughout the uptime of a given host.

In the illustrated embodiment, the system power management controller 108 comprises a computing device and/or corresponding software that can maintain the power state of allocated and unallocated cores on systems contained within the enterprise, such as the various hosts depicted in FIG. 1. In an embodiment, the system power management controller 108 can query a given host (or some or all hosts at once) to determine which cores are active (e.g., processing instructions for deployed workloads or applications) and which are not.

In an embodiment, the system power management controller 108 can implement a job scheduler (e.g., a cron job) to periodically query the hosts. In such an embodiment, the system power management controller 108 can periodically issue queries to each host to collect the state of the PUs of each host. The system power management controller 108 can then write the collected data to a file. In some embodiments, each host (e.g., host 110A) can include a script or binary file that is configured to detect the queries from system power management controller 108 and generate the statistics regarding processor core usage in response.

In an alternative embodiment, the system power management controller 108 can collect PU state data from hosts via a secure channel (e.g., secure shell (SSH)). In such an embodiment, the system power management controller 108 can issue a command to a host to collect PU state data. In some embodiments, each host (e.g., host 110A) can include a script or binary file that is configured to detect the queries from system power management controller 108 and generate the statistics regarding processor core usage in response.

In an alternative embodiment, the system power management controller 108 can utilize a declarative scripting language (e.g., ANSIBLE®, PUPPET®, CHEF®, etc.). In such an embodiment, the system power management controller 108 can maintain an inventory of hosts within the enterprise that can be created or generated. A playbook or similar data structure can then be used to connect to the hosts in the inventory and collect the core data for the node. In such an embodiment, the same playbook can be used to manage the lifecycle of the collection script running on the hosts. Thus, it can be used to push a new version of the script or delete the script from the hosts in the inventory.

In an alternative embodiment, a telemetry tool installed on hosts (e.g., PROMETHEUS® node_exporter, collectd, TELEGRAF®, etc.) can be modified to collect and publish the data via a network endpoint running on the host. In such an embodiment, the telemetry tool can publish core status information via a socket connection. In some embodiments, the socket connection can re-use an existing exporter (e.g., PROMETHEUS® node_exporter or collectd) and work as a plugin to an existing exporter (e.g., TELEGRAF®). In some embodiments, a declarative system configuration scripting language (e.g., ANSIBLE®, PUPPET®, CHEF) can perform the installation and lifecycle management of the exporter.

In some embodiments, all or some of the above approaches can be utilized together. For example, a host equipped with a modified telemetry tool can push PU state data while another host without such a tool can respond to queries issued via a job scheduler or secure shell. In some embodiments, the system power management controller 108 can be configured to detect duplicate hosts, and thus no limit is placed on the combination of querying techniques.

Once hosts in the system 100 are identified, the system power management controller 108 can record them in a local or remote database and issue commands (e.g., via SSH remote execution) to disable the identified targets based on predictions made by the analytics platform 104, as will be discussed.

In the illustrated embodiment, the system power management controller 108 can further communicate with virtualization platform controller 102 and orchestration platform controller 106. In the illustrated embodiment, the virtualization platform controller 102 can be responsible for the management of virtualized guest workloads deployed to the hosts. Specific details on virtualization platform controller 102 are not included herein; any type of virtualization manager (e.g., OPENSTACK®-based manager) can be used. In the illustrated embodiment, the system power management controller 108 can notify the virtualization platform controller 102 when PUs are disabled on specific hosts within the virtualization platform, cloud, Virtualized Infrastructure Manager (VIM), or cluster. In some embodiments, the system power management controller 108 can transmit a power state message that includes a host identifier, the total number of PUs on the host, and a list of PUs that were or are being disabled. Conversely, the virtualization platform controller 102 can transmit a message to the system power management controller 108 to indicate that PUs should be activated. The virtualization platform controller 102 can issue such a request based on the deployment of virtual machine instances or other management and orchestration needs. In an embodiment, the virtualization platform controller 102 can issue a message to enable cores that includes a host identifier and a number of cores requested to enable. In response, the system power management controller 108 can issue a command (e.g., via SSH) to the identified host to enable the needed PUs.

In an embodiment, the orchestration platform controller 106 can also issue commands to the system power management controller 108 during the management of containerized workloads. The orchestration platform controller 106 can comprise any system (e.g., KUBERNETES®) designed to manage and orchestrate containerized workloads, and the specific details of such platforms are not provided in detail herein.

In an embodiment, the orchestration platform controller 106 can expose a site inventory application programming interface (API) endpoint to the system power management controller 108. In an embodiment, the site inventory API can return a total number of hosts in the orchestration site, and the total number of active PUs in the orchestration site, and the total number of inactive PUs in the orchestration site. The orchestration platform controller 106 can further expose an all-host inventory API that returns the total number of hosts with active cores and the total number of hosts with inactive cores. The orchestration platform controller 106 can further expose a host inventory API that returns the total number of PUs for a given host, the total number of active PUs for a given host, and the total number of inactive PUs for a given host. The orchestration platform controller 106 can further expose an add PU API that allows system power management controller 108 to enable PUs on a given host managed by orchestration platform controller 106.

The system power management controller 108 can further communicate with analytics platform 104. In some embodiments, the analytics platform 104 can provide power reduction candidates to the system power management controller 108. In some embodiments, the analytics platform 104 can selectively enable and disable the providing of power reduction candidates to the system power management controller 108. For example, the analytics platform 104 can be enabled for one or more specific hosts or guest workloads. Alternatively, the analytics platform 104 can be enabled for all active hosts and guest workloads. In an embodiment, a power reduction candidate can include a hostname of a host (e.g., server), a list of PU identifiers, a list of corresponding PU states (e.g., c- or p-state values), and a list of corresponding reasons (in human- or machine-readable format). In an alternative embodiment, the power reduction candidate can include a hostname of a host (e.g., server), an array of PU identifiers, a maximum PU state target (e.g., maximum c- or p-state target) value, and a reason for adjusting the PU state.

In some embodiments, the system power management controller 108 can respond to a message including a power reduction candidate from the analytics platform 104 by returning a response code. In an embodiment, the response code can confirm that the request has been executed or that the request has been denied for a specified reason. In some embodiments, the analytics platform 104 can use the response code to update a predictive model, so all subsequent decisions adhere to the same logic path. For example, if the system power management controller 108 provides a confirmation, it will reinforce the logic path in the analytics platform 104. Conversely, if system power management controller 108 denies the request, the analytics platform 104 model will be updated with the same reason code. In some embodiments, the analytics platform 104 can implement this reinforcement by modifying the training data to include the response code as a label for the details of a given host.

In some embodiments, the system power management controller 108 can periodically receive power reduction candidates from analytics platform 104 and adjust the PU state of the host identified in the power reduction candidate accordingly. Details of analytics platform 104 and how power reduction candidates are identified are provided in more detail below.

Figure 2:
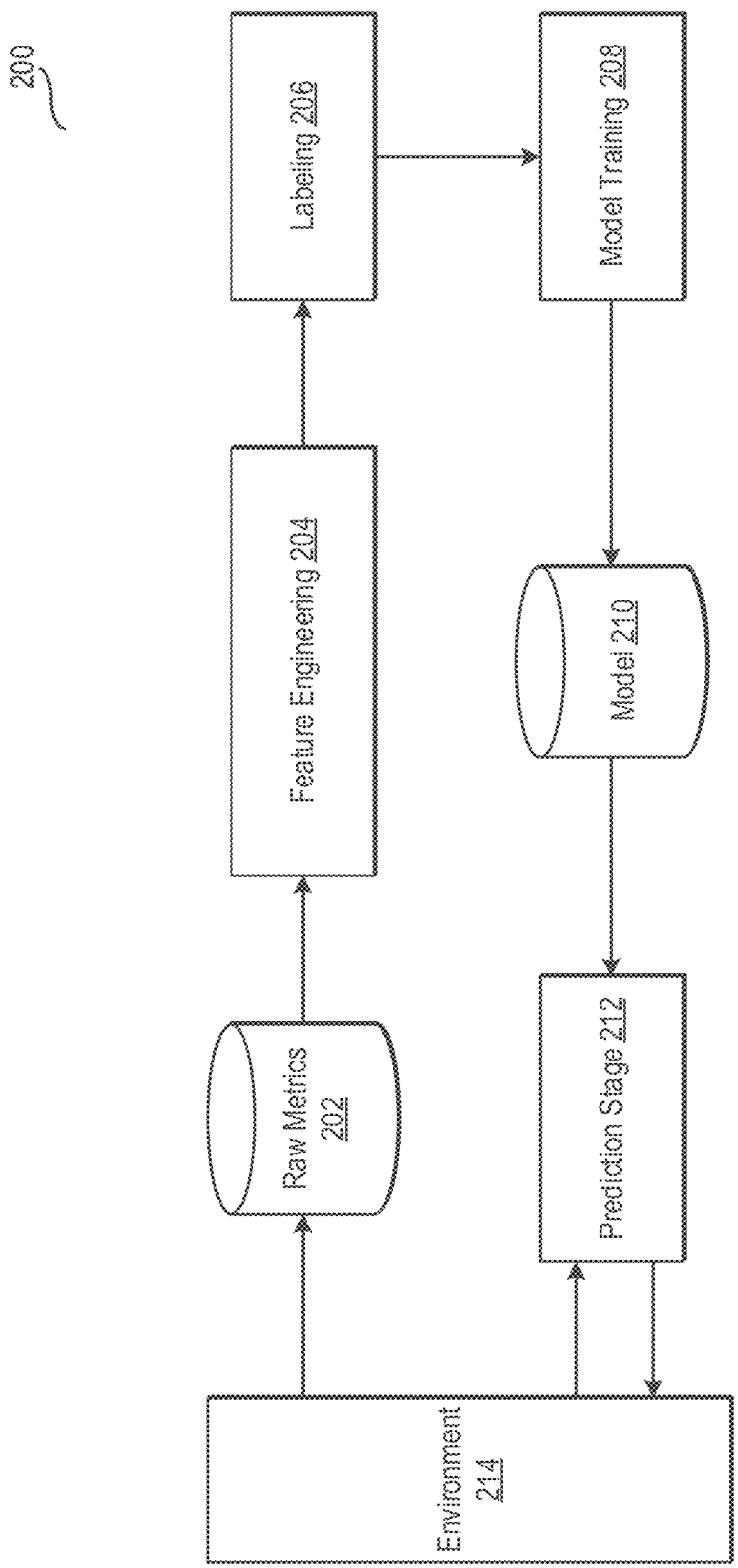
FIG. 2 is a block diagram of an analytics platform for adjusting processor states according to some example embodiments.

FIG. 2 is a block diagram of an analytics platform 200 for adjusting processor states according to some example embodiments.

One of the challenges of changing the power profile of a CPU in a production environment is ensuring that there is no degradation to performance on any node that supports an active guest virtual machine workload. In order to maximize the power savings while reducing the risk to virtualized guest workloads, there are a number of different inputs sampled at high frequencies resulting in very large datasets.

Determining specifically which inputs to use (and attributes within those inputs) when identifying which resources are optimal for power adjustment is a challenging task. Given the number of elements that factor into the classification and decision process for success, manual selection based on an engineer's knowledge and preferences can introduce deficiencies into the process. To avoid this risk, the analytics platform 200 provides an automated selection framework to identify resource candidates with a high potential for power savings. This automated selection framework is based on a data mining methodology that leverages the functional aspects of collecting, processing, and learning from the data as a whole.

In an embodiment, the analytics platform 200 includes a database 202 of raw metrics, a feature engineering pipeline 204, a labeling stage 206, a model training stage 208, model storage 210, and a prediction stage 212.

In some embodiments, the analytics platform 200 can receive metrics regarding hosts in a data center or other large-scale computing environment 214. Examples of metrics include a hostname (e.g., fully-qualified domain name) of a device, a datacenter identifier or tag, a CPU or vCPU identifier (unique per-device), a count of the total number of vCPUs, a count of the total number of vCPUs in use, a count of the total number of running virtual machine (VM) instances, a site or location identifier, a device status, a physical processor identifier, a processor vendor identifier, an architecture label (e.g., x86_64), a VM classification (e.g., guest workload type), a current clock speed, a maximum clock speed, and other various metrics related to the processing capabilities of the device.

In some embodiments, the analytics platform 200 can receive the metrics via the system power management controller 108. However, in other embodiments, the analytics platform 200 can receive the metrics via telemetry busses implemented as part of a virtualized or containerized environment. The analytics platform 200 can store all metrics, without processing or with limited processing, in database 202 for further processing.

In the illustrated embodiment, a feature engineering pipeline 204 loads metrics from database 202 and converts the raw metrics into examples for use in training a machine learning model, as described briefly below and in FIG. 4. In an embodiment, the feature engineering pipeline 204 extracts relevant data inputs for evaluation from database 202. These inputs can be classified as either structural or statistical in nature. Structural data provides a relatively stable context to the dataset, while the statistical elements vary based on the sampling timeframes illustrating various peaks and averages based on workload assignment. Various types of data analyzed during the feature engineering pipeline 204 are described more fully in FIG. 4.

Once the feature engineering pipeline 204 generates examples, it provides these examples to labeling stage 206. In response, the labeling stage 206 applies one or more pattern matching rules to generate labels for the examples. In one embodiment, the labeling stage 206 applies conditional logic rules, defined in the rules, to the features in the examples to generate a label. In one embodiment, the label can comprise a c- or p-state setting for a given host based on the features in the example. After applying the rules and assigning a label to each example, the labeling stage 206 outputs a set of labeled examples to model training stage 208.

In model training stage 208, the analytics platform 200 trains a discriminative machine learning model. In an embodiment, the machine learning model can comprise a decision tree, random forest, or a Naïve Bayes classifier. In an embodiment, the machine learning model can comprise a C4.5 decision tree.

FIG. 3 is a flow diagram illustrating a method for adjusting processor states according to some example embodiments.

In step 302, method 300 can include receiving processor data from a host.

As described, in some embodiments, method 300 can maintain a database of available hosts in a network (e.g., data center). In some embodiments, a system can periodically execute method 300 for each identified host. For example, the system can use a job scheduler or similar technique to schedule the execution of method 300. In some embodiments, a system power management controller 108 can perform method 300.

In an embodiment, method 300 can proactively query a host for processor state data. In other embodiments, method 300 can receive processor state data from hosts in a push manner. In some embodiments, the processor state data comprises statistical data, either real-time or near real-time processor state data. Examples of processor state data include data such as the number of PUs in use by the host, the number of inactive PUs, etc.

In step 304, method 300 can include augmenting the processor state data with static data. As used herein, static data can comprise relatively stable data regarding a host. For example, static data can include relatively unchanging data such as a processor manufacturer, processor part number, hostname, processor architecture, etc. In some embodiments, the static data can be read from a database of available hosts. In some embodiments, this database of available hosts corresponds to the database used to identify hosts in step 302.

In step 306, method 300 can include generating a feature vector using the static data and processor state data and predicting a next processor state for the host represented by the feature vector. In an embodiment, method 300 can input the feature vector into a machine learning model such as a decision tree, random forest, naïve Bayes, or similar model. In an embodiment, the machine learning model outputs a processor state based on the feature vector according to the underlying model parameters (discussed in FIG. 4). In an embodiment, the machine learning model can predict a c-state or p-state value for a given host based on the feature vector. In some embodiments, machine learning can further predict a list of PUs, the list of PUs including those PUs whose state should be modified.

In step 308, method 300 can include transmitting a processor state change message to a host.

As discussed in connection with FIG. 1, in some embodiments, a system power management controller 108 can issue the processor state change message to a host, and the host can execute a script to adjust the processor state in response. In some embodiments, the processor state change message includes a desired (or maximum) c-state or p-state value and a list of PU identifiers (e.g., core identifiers). In response, the host can execute a locally installed script or binary that adjusts the kernel based on the received processor state change message and returns a status message indicating whether the processor state change message was successfully processed.

In an embodiment, method 300 can further comprise transmitting the processor state change message (or similar content) to a virtualization platform controller 102 or orchestration platform controller 106. In such an embodiment, method 300 can augment the processor state change message to include data identifying a host such that the virtualization platform controller 102 or orchestration platform controller 106 can update internal databases monitoring processor usage of the system.

As discussed above, method 300 can be executed periodically and for each host. Thus, although method 300 is described as occurring once and for a single host, method 300 can be executed as necessary and repeatedly for all hosts in a data center or similar environment.

FIG. 4 is a flow diagram illustrating a method 400 for training a predictive CPU state model according to some of the example embodiments.

In step 402, method 400 can include recording host metrics. In some embodiments, the host metrics can comprise raw metrics reported by hosts as part of a telemetry service or similar service.

In step 404, method 400 can include generating an observed dataset. In an embodiment, the observed dataset comprises a set of examples, each example comprising a plurality of features. Each feature can be obtained by querying datacenter hardware or other monitoring devices.

In an embodiment, each example is associated with a central processing unit (CPU) or virtual CPU. Thus, as an example, a data center having 9,000 devices (e.g., servers) with each server running forty vCPUs, an observed dataset may have up to 360,000 training examples.

In an embodiment, each training example includes various features, and the disclosure is not limited to a specific set of features. Examples of features include a hostname (e.g., fully-qualified domain name) of a device, a datacenter identifier or tag, a CPU or vCPU identifier (unique per-device), a count of the total number of PUs, a count of the total number of PUs in use, a count of the total number of inactive PUs, a count of the total number of running virtual machine (VM) instances, a site or location identifier, a device status, a physical processor identifier, a processor vendor identifier, an architecture label (e.g., x86_64), a VM classification (e.g., guest workload type), a current clock speed, a maximum clock speed, and other various metrics related to the processing capabilities of the device. In some embodiments, method 400 can identify the time a guest workload was last active and perform a time-based analysis to determine when a PU executing the guest workload is considered active (based on, for example, the last time the guest workload was active). For example, the feature can be represented as a time since last active. In a decision tree, discussed below, the last active time can be used as a decision on whether the state of the PU should be changed given the recency (or lack thereof) of a guest workload being active.

In step 406, method 400 can include labeling the observed dataset using a set of rules. In some embodiments, the rules can include conditions defining labels based on the features in each example. In one embodiment, the rules can map a given set of features to a preferred processor state. For example, the rules can map a given set of features matching certain conditions to a preferred c-state or p-state. In other embodiments, the rules can map a given set of features matching certain conditions to an ideal number of active cores. In these two examples, the resulting label would comprise a c-state or p-state identifier (e.g., label) or a numeric label (e.g., number of cores). In some embodiments, the numeric label can be considered a classification label given a finite field of possible active core values.

In some embodiments, method 400 can reduce the observed dataset by removing any descriptive fields. For example, method 400 can remove any string or object-formatted fields (e.g., hostnames). As such, method 400 can reduce the observed dataset by only maintaining numeric fields.

In step 408, method 400 can include splitting the observed dataset into a training dataset and a testing dataset. In some embodiments, the testing dataset is larger than the training dataset. For example, the training dataset can comprise ten percent of the observed dataset, while the testing dataset can comprise the remaining ninety percent. In some embodiments, method 400 can include shuffling the observed training dataset prior to splitting.

In step 410, method 400 can include training and validating a machine learning model.

In some embodiments, the machine learning model can comprise a classification model. In other embodiments, the machine learning model can comprise a regression model. In some embodiments, the machine learning model can comprise a decision tree or random forest model. In some embodiments, the random forest model can include a plurality of (e.g., 1,000) learned decision trees. In some embodiments, the decision tree (or decision trees in a random forest) can comprise C4.5 decision trees. An example of a trained decision tree is provided in FIG. 5.

After training, method 400 can include using the retained testing dataset to validate the trained model. In some embodiments, unlabeled samples from the testing dataset can be input into the trained model and the resulting outputs compared to the labels. The difference can then be used to represent the accuracy of the model. In some embodiments, the accuracy can be alternatively represented as a mean absolute error or mean absolute percentage error.

In step 412, method 400 can include storing the model. In some embodiments, method 400 can write the trained parameters of the model to a database or other storage mechanism (e.g., flat file). In some embodiments, method 400 can write the model to a binary file storing all details of the model.

The environment within a cloud computing platform is by its very nature transient and dynamic, with workloads spinning up and down or moving within the infrastructure as needed. In such an environment, method 400 can be repeated iteratively on a set cadence to ensure that PUs within the environment are continuously classified, and specific actions (i.e., adjusting of the power profile) can be taken in accordance with the identified profile.

Figure 5:
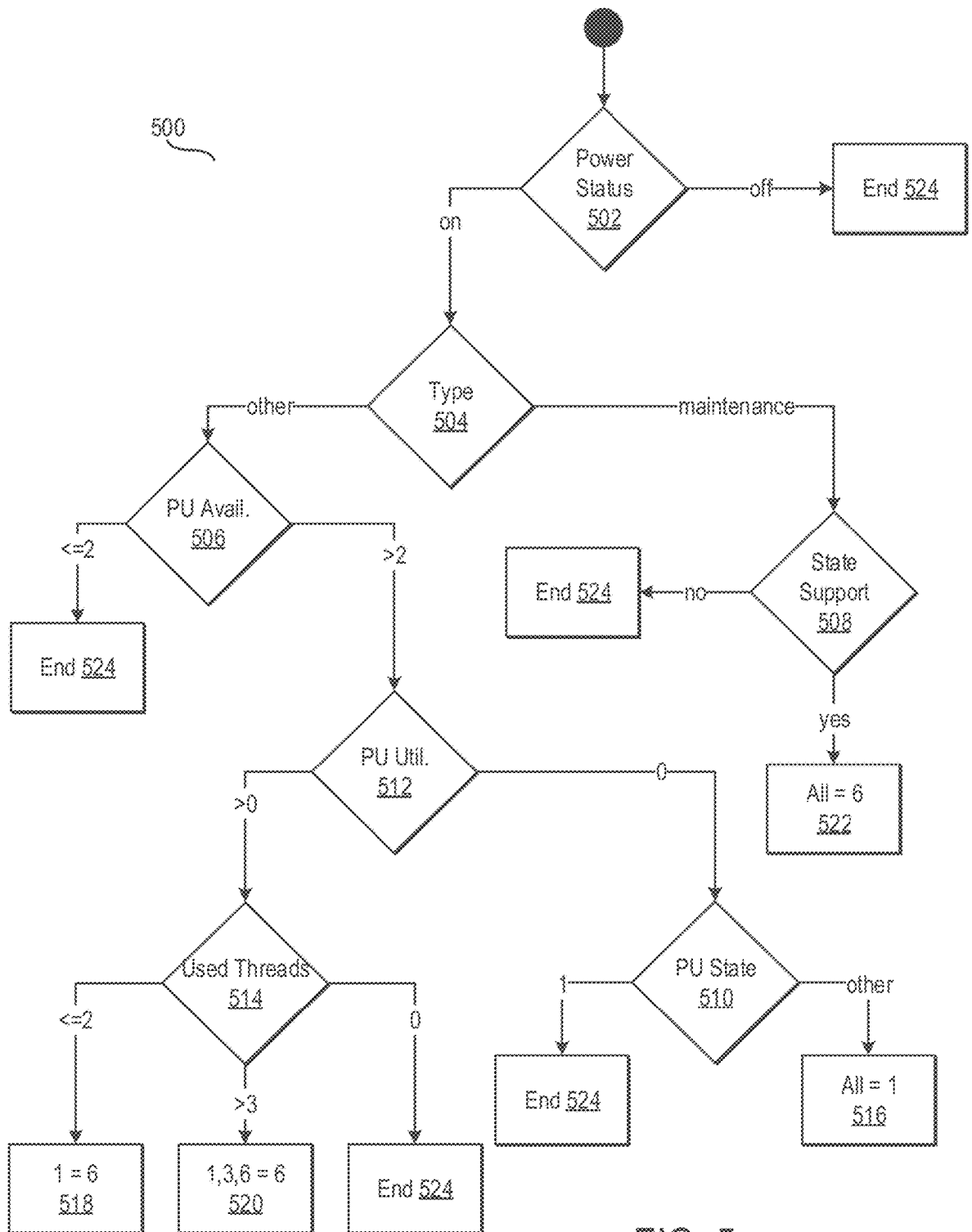
FIG. 5 is a diagram illustrating an example of a decision tree according to some of the example embodiments.

FIG. 5 is a diagram illustrating an example of a decision tree 500 according to some of the example embodiments.

The decision tree 500 can comprise the machine learning model trained in FIG. 4 and used in FIG. 3. Alternatively, the decision tree 500 can comprise one decision tree in a random forest machine learning model of multiple decision trees. The specific nodes and decisions in FIG. 5 are provided as an example and are not limiting.

In the illustrated embodiment, the decision tree 500 receives data describing a host. A power status decision 502 determines what the power status of a host is (e.g., on or off). A system can determine that a host is powered off if no response to a telemetry query is received or if the host was intentionally powered down. When a host is powered off, the decision tree 500 can end in step 524. In one embodiment, step 524 comprises outputting a no-change in processor state.

If, however, the host is powered on, the decision tree 500 next checks the type of host in type decision 504. In the illustrated embodiment, the choice is binary: maintenance or non-maintenance. However, other decision trees may not be limited as such. If the host is a maintenance host, the decision tree 500 next checks if the maintenance host supports processor state changes in state support decision 508. If not, the decision tree 500 can end in step 524. In one embodiment, step 524 comprises outputting a no-change in processor state. If, however, the maintenance host supports processor state changes, the decision tree 500 outputs a state change in step 522. As illustrated, in an embodiment, the state change can comprise instructing the host to change a c-stage of all PUs to a maximum of C6. Certainly, other state changes may be predicted in step 516.

Returning to type decision 504, the decision tree 500 determines that the host is a non-maintenance host (i.e., a production host), the decision tree 500 next determines the PU availability in availability decision 506. If less than two PUs are available for use (i.e., are inactive), the decision tree 500 can end in step 524. In one embodiment, step 524 comprises outputting a no-change in processor state. As illustrated, during training, it was observed that when a production machine only has two or fewer PUs available, the few remaining PUs should not be powered down, given the potential for usage.

If the decision tree 500 determines (in availability decision 506) that the available PUs is greater than two, the decision tree 500 next determines how many PUs are being utilized (i.e., are active) in utilization decision 512. If no PUs are being utilized, the decision tree 500 next determines what the current c-state of the PUs is in state decision 510. If the decision tree 500 determines that the PUs are in a c-state other than C1, the decision tree 500 will output a state change in step 516 that causes the host to change the c-state of the PUs to C1. If, however, the PUs are already in a c-state of C1, the decision tree 500 can end in step 524. In one embodiment, step 524 comprises outputting a no-change in processor state.

Returning to utilization decision 512, if the decision tree 500 determines that the PU utilization is non-zero, the decision tree 500 next determines how many unused sibling threads are available in the host in thread decision 514. As illustrated, the decision in thread decision 514 comprises three potential outputs. If the number of unused sibling threads is two or more, the decision tree 500 outputs a state change in step 518, instructing a first PU (identified by PU1) to change to state C6. If the number of unused sibling threads is greater than three, the decision tree 500 outputs a state change in step 520 instructing three PUs (identified by PU1, PU3, PU6) to change to state C6. If no unused sibling threads are present, the decision tree 500 can end in step 524. In one embodiment, step 524 comprises outputting a no-change in processor state FIG. 6 is a block diagram illustrating a computing device showing an example of a client or server device used in the various embodiments.

Figure 6:
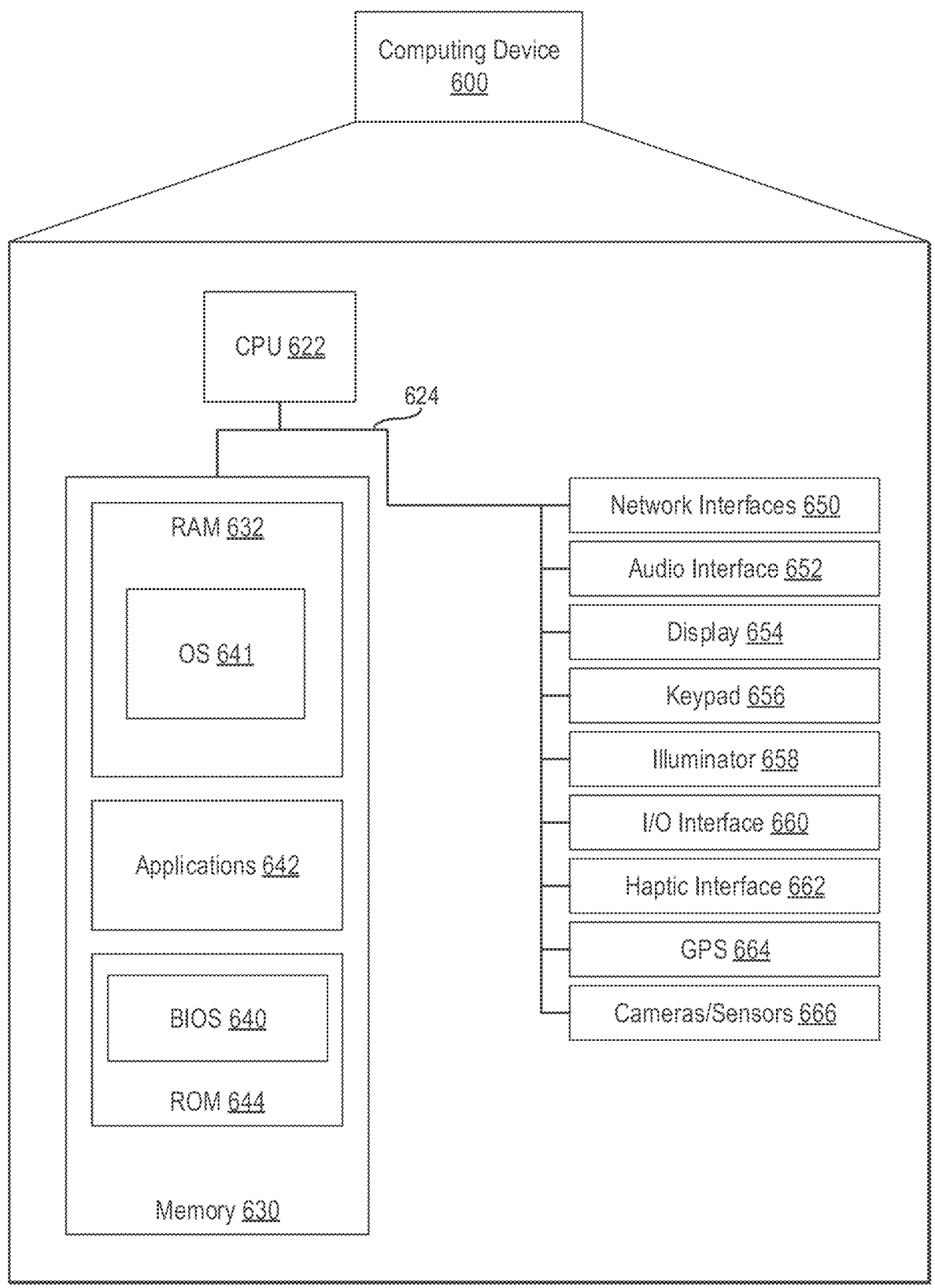
FIG. 6 is a block diagram illustrating a computing device showing an example of a client or server device used in the example embodiments.

The computing device 600 may include more or fewer components than those shown in FIG. 6, depending on the deployment or usage of the computing device 600. For example, a server computing device, such as a rack-mounted server, may not include an audio interface 652, display 654, keypad 656, illuminator 658, haptic interface 662, Global Positioning System receiver 664, or sensors 666 (e.g., camera, temperature sensor, etc.). Some devices may include additional components not shown, such as graphics processing unit (GPU) devices, cryptographic coprocessors, artificial intelligence (AI) accelerators, or other peripheral devices.

As shown in the figure, the computing device 600 includes a central processing unit (CPU) 622 in communication with a mass memory 630 via a bus 624. The computing device 600 also includes a network interface 650, an audio interface 652, a display 654, a keypad 656, an illuminator 658, an input/output interface 660, a haptic interface 662, a Global Positioning System receiver 664, and cameras or sensors 666 (e.g., optical, thermal, or electromagnetic sensors). Computing device 600 can include sensors 666. The positioning of the sensors 666 on the computing device 600 can change per computing device 600 models, per computing device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640 in read-only memory (ROM) 644, for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The Global Positioning System receiver 664 can determine the physical coordinates of the computing device 600 on the surface of the Earth, which typically outputs a location as latitude and longitude values. Global Positioning System receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative and do not unduly limit the covered subject matter. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

We claim:

1. A method comprising:
receiving data associated with a host device, the data comprising processor statistics of the host device;
generating a feature vector for the host device, the feature vector including data derived from the processor statistics;
classifying the feature vector using a predictive model, the predictive model generating a processor state for the host device based on the feature vector; and
issuing a processor state change message to the host device based on the processor state, the processor state change message causing the host device to reduce power consumption of one or more processing units based on the processor state.

2. The method of claim 1, wherein the processor statistics of the host device comprise one or more of a total number of processing units of the host device, a total number of active processing units of the host device, and a total number of inactive processing units of the host device.

3. The method of claim 1, wherein generating a feature vector for the host device comprises combining the data derived from the processor statistics with static data associated with the host device.

4. The method of claim 1, wherein classifying the feature vector using a predictive model comprises inputting the feature vector into one of a decision tree, random forest, or naïve Bayes classifier.

5. The method of claim 1, wherein generating a processor state comprises generating a processor state value, the processor state value comprising one of a c-state value or p-state value.

6. The method of claim 5, wherein generating a processor state comprises generating at least one processing unit identifier associated with the processor state value.

7. The method of claim 1, wherein issuing a processor state change message to the host device based on the processor state comprises issuing the processor state change message to the host device using a secure channel, the host device configured to execute a script or binary to change a processor state of the host device.

8. A non-transitory computer-readable storage medium for tangibly storing computer program instructions capable of being executed by a computer processor, the computer program instructions defining steps of:
receiving data associated with a host device, the data comprising processor statistics of the host device;
generating a feature vector for the host device, the feature vector including data derived from the processor statistics;
classifying the feature vector using a predictive model, the predictive model generating a processor state for the host device based on the feature vector; and
issuing a processor state change message to the host device based on the processor state, the processor state change message causing the host device to reduce power consumption of one or more processing units based on the processor state.

9. The non-transitory computer-readable storage medium of claim 8, wherein the processor statistics of the host device comprise one or more of a total number of processing units of the host device, a total number of active processing units of the host device, and a total number of inactive processing units of the host device.

10. The non-transitory computer-readable storage medium of claim 8, wherein generating a feature vector for the host device comprises combining the data derived from the processor statistics with static data associated with the host device.

11. The non-transitory computer-readable storage medium of claim 8, wherein classifying the feature vector using a predictive model comprises inputting the feature vector into one of a decision tree, random forest, or naïve Bayes classifier.

12. The non-transitory computer-readable storage medium of claim 8, wherein generating a processor state comprises generating a processor state value, the processor state value comprising one of a c-state value or p-state value.

13. The non-transitory computer-readable storage medium of claim 12, wherein generating a processor state comprises generating at least one processing unit identifier associated with the processor state value.

14. The non-transitory computer-readable storage medium of claim 8, wherein issuing a processor state change message to the host device based on the processor state comprises issuing the processor state change message to the host device using a secure channel, the host device configured to execute a script or binary to change a processor state of the host device.

15. A device comprising:
a processor configured to:
receive data associated with a host device, the data comprising processor statistics of the host device;
generate a feature vector for the host device, the feature vector including data derived from the processor statistics;
classify the feature vector using a predictive model, the predictive model generating a processor state for the host device based on the feature vector; and
issue a processor state change message to the host device based on the processor state, the processor state change message causing the host device to reduce power consumption of one or more processing units based on the processor state.

16. The device of claim 15, wherein the processor statistics of the host device comprise one or more of a total number of processing units of the host device, a total number of active processing units of the host device, and a total number of inactive processing units of the host device.

17. The device of claim 15, wherein generating a feature vector for the host device comprises combining the data derived from the processor statistics with static data associated with the host device.

18. The device of claim 15, wherein classifying the feature vector using a predictive model comprises inputting the feature vector into one of a decision tree, random forest, or naïve Bayes classifier.

19. The device of claim 15, wherein generating a processor state comprises generating a processor state value, the processor state value comprising one of a c-state value or p-state value.

20. The device of claim 15, wherein issuing a processor state change message to the host device based on the processor state comprises issuing the processor state change message to the host device using a secure channel, the host device configured to execute a script or binary to change a processor state of the host device.

* * * * *